United States Patent [19]

Gallo

[11] 4,321,992

[45] Mar. 30, 1982

[54] WRAP SPRING COUPLING WITH IMPROVED SPRING

[75] Inventor: Charles C. Gallo, Philadelphia, Pa.

[73] Assignee: Warner Electric Brake & Clutch Company, South Beloit, Ill.

[21] Appl. No.: 166,071

[22] Filed: Jul. 7, 1980

[51] Int. Cl.³ .................. F16D 13/08; F16D 27/10
[52] U.S. Cl. ................... 192/81 C; 192/84 T
[58] Field of Search ................ 192/26, 33 C, 35, 36, 192/37, 81 C, 56 C, 84 T; 188/77 W

[56] References Cited

U.S. PATENT DOCUMENTS

| | | | |
|---|---|---|---|
| 3,185,276 | 5/1965 | Sajovel Jr. ................. | 192/81 C |
| 3,349,880 | 10/1967 | Baer ......................... | 192/84 |
| 3,637,056 | 1/1972 | Baer ......................... | 192/12 BA |
| 3,648,810 | 3/1972 | Weatherby ................. | 192/26 |
| 3,726,372 | 4/1973 | Baer et al. ................. | 192/26 |
| 4,030,584 | 6/1977 | Lowery et al. ............. | 192/84 T |

OTHER PUBLICATIONS

PSI Clutches—MSC Series—No. P—573-Warner Electric, Rev. 10/74.

Primary Examiner—Allan D. Herrmann
Attorney, Agent, or Firm—Leydig, Voit, Osann, Mayer & Holt

[57] ABSTRACT

The helical spring of a wrap spring clutch is formed with a radially projecting protrusion which is spaced 180 degrees from one of the end tangs of the spring. The protrusion and the end tang are connected to the control collar of the clutch and cause the tensile force applied by the spring to be balanced angularly around the collar.

7 Claims, 5 Drawing Figures

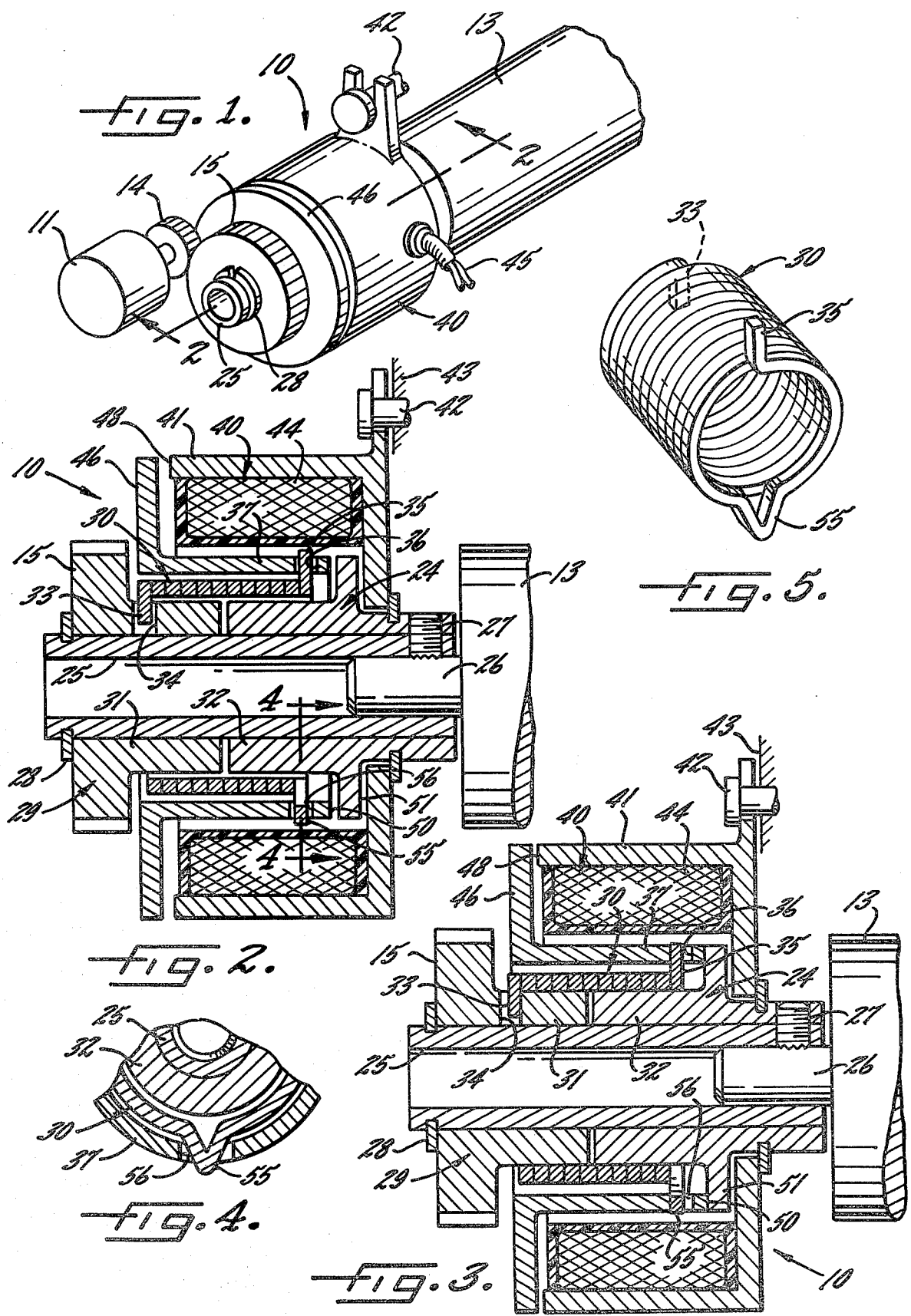

WRAP SPRING COUPLING WITH IMPROVED SPRING

BACKGROUND OF THE INVENTION

This invention relates to a wrap spring coupling of the type in which a coiled helical spring is telescoped over relatively rotatable input and output members. The invention more particularly relates to a wrap spring clutch of the type in which an annular control element or collar is shiftable axially relative to the input and output members. One end of the helical spring is connected to the control element while the other end of the spring is connected to one of the rotatable members so that the latter member, the spring and the control element all rotate in unison.

To engage the clutch, the control element is shifted axially into frictional engagement with the other rotatable member against the tensile force of the spring. Such engagement causes one end of the spring to rotate relative to the other so as to wrap the spring down on the members and cause the members to rotate in unison. When the clutch is disengaged, the tension in the spring pulls the control element out of frictional engagement with the rotatable member so that the spring may unwind and release the members for relative rotation.

SUMMARY OF THE INVENTION

The general aim of the present invention is to provide a new and improved wrap spring clutch in which the tensile force of the spring is prevented from cocking the control element relative to the input and output members.

A more detailed object of the invention is to achieve the foregoing by providing a clutch having a unique wrap spring which applies an angularly balanced tensile force to the control element.

A further object is to balance the tensile force applied by the spring by forming one end portion of the spring with angularly spaced and radially extending projections which are connected to and which act upon the control collar.

The invention also resides in a spring having one radially extending projection in the form of a conventional end tang and having an angularly spaced projection in the form of a protrusion which is bent from one coil of the spring.

These and other objects and advantages of the invention will become more apparent from the following detailed description when taken in conjunction with the accompanying drawings.

BRIEF DESCRIPTION OF THE DRAWINGS

FIG. 1 is a perspective view of a wrap spring clutch incorporating the unique features of the present invention.

FIG. 2 is an enlarged fragmentary cross-section taken substantially along the line 2—2 of FIG. 1 and shows the clutch in a disengaged condition.

FIG. 3 is a view similar to FIG. 2 but shows the clutch in an engaged condition.

FIG. 4 is a fragmentary cross-section taken substantially along the line 4—4 of FIG. 2.

FIG. 5 is a perspective view of the spring.

DETAILED DESCRIPTION OF THE PREFERRED EMBODIMENT

As shown in the drawings for purposes of illustration, the invention is embodied in a clutch 10 for coupling a driving element 11 and a driven element 13 for rotation in unison and selectively operable to uncouple the elements to allow rotation of either relative to the other. While the clutch will find numerous applications in widely varying environments, it is shown schematically in the drawings as being incorporated in a system in which the driving element 11 is a small motor and the driven element 13 is a paper feed roller. The motor 11 is connected by way of gears 14 and 15 to the input of the clutch 10 whose output, in turn, is connected to one end of the roller 13.

The clutch 10 is shown in detail in FIG. 2 and includes an output member 24 which is telescoped over and connected rigidly to one end portion of a central sleeve 25. A trunnion 26 on the end of the roller 13 is telescoped into the sleeve and is anchored for rotation with the latter by a set screw 27 threaded into the output member and the sleeve. Telescoped rotatably over the opposite end portion of the sleeve is an input member 29 to which the driving gear 15 is joined, a snap ring 28 on the end of the sleeve preventing movement of the input member along the sleeve. Thus, the feed motor 11 rotates the input member 29 on the sleeve 25 via the gear 15 and, when the input member is coupled to the output member 24, the latter rotates the sleeve to turn the roller 13. When the input and output members are uncoupled, the input member rotates freely on the sleeve while the output member remains stationary.

To releasably couple the input and output members 29 and 24, a coiled helical spring 30 is telescoped over reduced diameter hubs 31 and 32 (FIG. 2) formed at the inner end portions of the input and output members, respectively, and disposed end-to-end with one another, the hubs being of circular cross-section and each having the same diameter. The spring includes a large number of coils wound with a relaxed inner diameter which is greater than the diameter of the hubs and thus the spring normally is disposed in loosely surrounding relationship with the hubs.

A radially projecting tang 33 is formed integrally with one end of the spring 30 and projects radially inwardly into a hole 34 formed in the input hub 31. Formed integrally with the opposite end of the spring is another tang 35 which projects radially outwardly. The tang 35 is received within an axially extending slot 36 formed in one end portion of an annular control element or control 37 which is telescoped loosely over the spring. By virtue of the spring 30, the input hub 31, the spring and the control collar 37 rotate as a unit.

To engage the clutch 10, the control collar 37 is turned through a small distance relative to the input hub 31 and in a direction to cause the spring to contract radially. As a result, the spring wraps down tightly on the two hubs 31 and 32 to couple the hubs for rotation in unison. When the control collar is turned in the reverse direction relative to the input hub, the spring is allowed to unwind and release the hubs.

Turning of the control collar 37 is effected in response to energization and de-energization of a stationary electromagnet 40. As shown in FIG. 2, the magnet includes an annular, cup-shaped shell 41 which loosely encircles the collar 37 and which is fastened at 42 to a stationary frame or bracket 43. A multiple turn winding 44 is disposed within and is secured to the shell and is adapted to be selectively energized by current supplied by a suitable voltage source (not shown) which is connected to the winding by lead wires 45 (FIG. 1).

When the winding 44 is energized, magnetic flux attracts a radially extending flange 46 (FIG. 2) on the control collar 37 toward one end face 48 of the shell 41. As a result, the control collar 37 is shifted axially to the right against the tensile force of the spring 30. Such shifting brings the right end face 50 of the collar into frictional engagement with a radially extending flange 51 formed on the output member 24 adjacent the hub 32 (see FIG. 3). The momentary relative turning of the rotating collar 37 and the stationary flange 51 imposes a frictional drag on the collar and causes the latter to turn relative to the input hub 31. Accordingly, the spring 30 wraps down on and couples the hubs 31 and 32 as shown in FIG. 3.

Upon de-energization of the winding 44, the tensile force of the spring 30 shifts the collar 37 to the left and retracts the end face 50 of the collar out of frictional engagement with the flange 51. The spring thus unwinds to release the clutch 10 (see FIG. 2).

As described thus far, the clutch 10 is virtually identical to a magnetic spring clutch which has been sold for many years by the assignee of the present invention as a Series MSC clutch. In such a clutch, some difficulty has been encountered as a result of the tensile force of the spring 30 tending to cock the control collar 37 relative to the hubs 31 and 32.

In accordance with the present invention, the spring 30 is uniquely constructed so as to apply an angularly balanced tensile force to the control collar 37. As a result of the tensile force of the spring being angularly balanced, the collar is held in concentric relationship with the hubs 31 and 32 and does not tend to cock on the hubs.

In carrying out the invention, projecting means are formed on the spring 30, are spaced angularly from the end tang 35, and are connected to the collar 37 to balance the axial force applied to the collar by the end tang 35. Herein, the projecting means takes the form of a substantially V-shaped protrusion 55 which is formed by bending a portion of the final or right hand coil of the spring radially outwardly. The protrusion 55 is spaced 180 degrees from the end tang 35 and is adapted to be received in a hole 56 (FIG. 4) in the collar 37.

By virtue of the protrusion 55, the tensile force of the spring 30 is applied to the collar 37 at two diametrically spaced points on the collar, that is, at the location of the protrusion and at the location of the end tang 35. As as result, the tensile force of the spring is balanced angularly around the collar and thus the collar tends to remain concentric with the hubs 31 and 32 rather than cocking relative to the hubs. The flange 46 thus tends to remain parallel to the end face 48 of the shell 41 to improve the magnetic characteristics of the clutch 10. Also, the end face 50 of the collar 37 tends to remain parallel to the flange 51 so that better frictional engagement may be established between the end face 50 and the flange 51.

While only a single protrusion 55 has been shown in the drawings, it should be appreciated that more than one protrusion could be employed. For example, the spring 30 could be formed with two protrusions each spaced 120 degrees from each other and from the end tang 35. Also, the spring may be used in conjunction with a wrap spring brake as well as a clutch.

I claim:

1. A wrap spring coupling comprising two relatively rotatable members, an annular control element shiftable axially relative to said members, a coiled helical spring telescoped over said members, said spring having one end connected to said control element and having its opposite end connected to one of said members, and projecting means on said spring in angularly spaced relation with said one end of said spring and connected to said control element.

2. A wrap spring couping as defined in claim 1 in which said projecting means comprising a protrusion formed integrally with and projecting radially outwardly from one of the coils of said spring.

3. A wrap spring coupling as defined in claim 2 in which said protrusion projects radially outwardly from the final coil of the spring located adjacent said one end of said spring.

4. A wrap spring coupling as defined in claim 3 in which said protrusion is substantially V-shaped.

5. A wrap spring coupling as defined in either of claims 2, 3 or 4 in which said protrusion is spaced approximately 180 degrees from said one end of said spring.

6. A wrap spring clutch comprising relatively rotatable input and output members, a control collar telescoped over and shiftable axially relative to said members, a coiled helical spring telescoped over said members and into said collar, said spring having one end tang connected to said collar and having an opposite end tang connected to one of said members, and a protrusion formed integrally with and projecting radially outwardly from the final coil of the spring located adjacent said one tank of said spring, said protrusion being spaced angularly from said one tang and being connected to said control collar.

7. A wrap spring clutch as defined in claim 6 in which said protrusion is spaced approximately 180 degrees from said one tang of said spring.

* * * * *